United States Patent
Lasaruk et al.

(10) Patent No.: US 11,062,478 B2
(45) Date of Patent: Jul. 13, 2021

(54) DEVICE AND METHOD FOR CALIBRATING A CAMERA SYSTEM OF A VEHICLE

(71) Applicant: Conti Temic microelectronic GmbH, Nuremberg (DE)

(72) Inventors: Aless Lasaruk, Lindau (DE); Thomas Ruland, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/609,609

(22) PCT Filed: Apr. 27, 2018

(86) PCT No.: PCT/DE2018/200040
§ 371 (c)(1),
(2) Date: Oct. 30, 2019

(87) PCT Pub. No.: WO2018/202258
PCT Pub. Date: Nov. 8, 2018

(65) Prior Publication Data
US 2020/0065996 A1  Feb. 27, 2020

(30) Foreign Application Priority Data
May 5, 2017  (DE) .................. 10 2017 207 614.3

(51) Int. Cl.
*G06T 7/80* (2017.01)
*G06T 7/73* (2017.01)

(52) U.S. Cl.
CPC .................. *G06T 7/80* (2017.01); *G06T 7/73* (2017.01); *B60R 2300/402* (2013.01);
(Continued)

(58) Field of Classification Search
CPC ... G06T 7/80; G06T 7/73; G06T 2207/10016; G06T 2207/30244; G06T 2207/30252; B60R 2300/402
(Continued)

(56) References Cited

U.S. PATENT DOCUMENTS

| | | | |
|---|---|---|---|
| 2008/0007619 A1* | 1/2008 | Shima | .................. G06T 7/80 348/118 |
| 2014/0313347 A1 | 10/2014 | Wu et al. | |
| 2017/0032526 A1 | 2/2017 | Gao et al. | |

FOREIGN PATENT DOCUMENTS

| | | |
|---|---|---|
| DE | 102004033468 | 12/2005 |
| EP | 2 166 510 | 3/2010 |
| WO | WO 2016/070318 | 5/2016 |

OTHER PUBLICATIONS

PCT Examiner Oliver Rockinger, English translation of the International Search Report of the International Searching Authority for International Application PCT/DE2018/200040, dated Jul. 26, 2018, 3 pages, European Patent Office, HV Rijswijk, Netherlands.
(Continued)

*Primary Examiner* — John W Miller
*Assistant Examiner* — Sihar A Karwan
(74) *Attorney, Agent, or Firm* — W. F. Fasse (57) ABSTRACT

A device for calibrating a camera system of a vehicle is configured to calibrate the camera system during movement of the vehicle through a factory environment without specially arranged targets, by using a database including features of the factory environment and accompanying position information. The database can be updated with each calibration of a camera system. Relaying the database between such devices allows for successive improvement of the database.

19 Claims, 2 Drawing Sheets

(52) U.S. Cl.
CPC ............... *G06T 2207/10016* (2013.01); *G06T 2207/30244* (2013.01); *G06T 2207/30252* (2013.01)

(58) Field of Classification Search
USPC .......................................................... 348/187
See application file for complete search history.

(56) References Cited

OTHER PUBLICATIONS

PCT Examiner Nora Lindner, PCT International Preliminary Report on Patentability including English Translation of PCT Written Opinion of the International Searching Authority for International Application PCT/DE2018/200040, dated Nov. 5, 2019, 9 pages, International Bureau of WIPO, Geneva, Switzerland.

German Examiner Elmar Wittmann, German Search Report for German Patent Application No. 10 2017 207 614.3, dated Jan. 17, 2016, 10 pages, German Patent and Trademark Office, Muenchen, Germany, with partial English translation, 8 pages.

Ralph Foehr, "Photogrammetrische Erfassung Raeumlicher Informationen aus Videobildern" ("Photogrammetric Detection of Spatial Information from Video Images"), Fortschritte der Robotik (Advances in Robotics), vol. 7, Vieweg Verlag publisher, 1990, pp. 15, 23-24, 38-39, 54-66.

Roger Y. Tsai, "A Versatile Camera Calibration Technique for High-Accuracy 3D Machine Vision Metrology Using Off-the-Shelf TV Cameras and Lenses", IEEE Journal of Robotics and Automation, vol. RA-3, No. 4, Aug. 1987, pp. 324-344.

Homer H. Chen, "A Screw Motion Approach to Uniqueness Analysis of Head-Eye Geometry", Proceedings CVPR 1991, Maui, HI, USA, Jun. 1991, pp. 145-151.

Richard Hartley et al., "Multiple View Geometry in Computer Vision", 2nd edition, Cambridge Univ. Press, 2004, title pages, table of contents (pp. v-x), Sections 8 to 12 and 17, pp. 219-331, and 423-440.

\* cited by examiner

DEVICE AND METHOD FOR CALIBRATING A CAMERA SYSTEM OF A VEHICLE

FIELD OF THE INVENTION

The invention relates to the calibration of camera systems of vehicles. In particular, the invention relates to a device for calibrating a camera system for a driver assistance system for a vehicle, a system for calibrating the camera system and a method for calibrating the camera system.

BACKGROUND

Modern driver assistance systems generally use different sensor technologies for sensing the surroundings of the vehicle. Camera systems play a prominent role in this regard. In order to estimate the positions of objects in the surroundings of the vehicle by means of a camera system, it is necessary that the camera system is calibrated. During calibration, the formal relation between positions in space and corresponding points in the images captured by the camera system is determined and stored as a parameter set. The calibration can include the estimation of both intrinsic and extrinsic parameters of the camera system. The intrinsic parameters of a camera describe the light paths of the optical system and can include the focal length, the geometry of the image sensor and the focal point. In contrast, the extrinsic parameters of a camera describe the position and orientation of the camera for a coordinate system that is fixed with respect to the vehicle.

Heretofore, calibrating methods for camera systems of driver assistance systems included a number of cost-intensive steps: commonly, optics-based, camera-based and vehicle-based calibrations as successive process steps.

In optics-based calibration, the intrinsic parameters in optics which are possibly partially installed are determined and tested. This step normally takes place at the end of the optics module conveyor lines of the camera manufacturer. Collimation-based and target-based methods are used for this purpose.

On the other hand, camera-based calibration requires a completely assembled camera which does not undergo any further mechanical manufacturing steps outside of installation in the vehicle. In camera-based calibration, the quality of the installation of the optics in the camera is determined and tested. In this regard, target-based methods are state-of-the-art. More precisely, easily recognizable patterns, for example, checkerboards, with a precisely produced geometry are used. For reasons of resources and costs, only part of the subsequent viewing cone in front of the camera is generally covered by calibrating targets.

In vehicle-based calibration, the camera installed in a vehicle is measured. The aim of this process step is to check the installed position of the camera in the vehicle. For this purpose, expensive target-based methods are state-of-the-art. Specifically, the vehicle must be exactly aligned with the target. A chassis dynamometer is conventionally used for this purpose.

The invention aims to dispense with module-based, camera-based and vehicle-based steps of calibration as far as possible and to reduce the latter to simple tests. This is achieved in that the camera system of the driver assistance system is dynamically calibrated without special targets in the factory of the vehicle manufacturer while the vehicle moves through the factory building. The central aspect of the invention consists in that no highly precisely manufactured and/or measured targets are needed for the calibration. This is achieved in that the rigid or static part of the factory environment is measured one time and is used as a calibrating target.

SUMMARY OF THE INVENTION

An object of the invention consists in providing a less expensive and more precise calibration of camera systems for driver assistance systems.

A first aspect of the invention relates to a device for calibrating a camera system for a vehicle. The device has a first receiving unit for receiving first image data. The first image data comprise a plurality of images of a factory environment, the images of the first image data correspond to a plurality of first recording positions or a plurality of first recording directions, and the first image data were captured by the camera system to be calibrated. Further, the device has a first extraction unit for extracting features from the first image data and a first association unit for associating features extracted from the first image data with features of the factory environment of a database. The database comprises features of the factory environment and accompanying position information. Further, the device has a calibrating unit for estimating parameters of the camera system using the first image data and the position information of the associated features.

The device according to the invention can be configured to calibrate mono-camera systems and multi-camera systems. In the following, it will be assumed that the camera system is installed in the vehicle so as to be stationary. The first image data provided by the camera system to be calibrated comprise a plurality of images of a factory environment from a plurality of first recording positions or from a plurality of first recording directions. The first recording positions and the first recording directions may be unknown. In particular, the distances between the first recording positions and the angles between the first recording directions may be unknown. The number of different first recording positions and/or recording directions required for calibrating the camera system depends in particular on the complexity of the camera model to be estimated. In a multi-camera system, the cameras preferably capture images synchronously with respect to time. However, the device according to the invention for calibrating a camera system can also be configured to support asynchronous image recordings.

The device for calibrating the camera system has a first extraction unit for extracting features from the first image data. The images of the first image data are searched for features. In particular, point features are searched in the images of the first image data.

The first association unit of the device for calibrating the camera system is configured to associate the features extracted from the first image data with features of the factory environment of the database. The database may be part of the device according to the invention for calibrating a camera system. However, it is also possible that the database is stored, for example, on a server with which the device according to the invention for calibrating a camera system communicates. The database contains position information on the features of the factory environment. The position information preferably includes the positions of the features relative to a fixed previously determined coordinate system. In particular cases, however, it is sufficient if the positions of the features are known only up to similarity transformations. In particular, the intrinsic parameters of the camera system can also be estimated when the positions of the features are known only up to similarity transformations.

The first association unit examines whether or not the features extracted from the images of the first image data are recorded in the database in order to determine position information of the features extracted from the first image data. The first association unit is accordingly configured to check the similarity of features extracted from the images of the first image data to features of the database. If a feature extracted from the first image data is sufficiently similar to a feature stored in the database, the association unit associates the position information stored in the database with the extracted feature.

The calibrating unit is configured to utilize the first image data and the position information of the features of the factory environment associated by the first association unit in order to calibrate the camera system. The calibrating unit can be configured to estimate both extrinsic and intrinsic parameters of the camera system. Alternatively, the calibrating unit can be configured to estimate only a portion of these parameters.

The device according to the invention for calibrating a camera system can be constructed as an independent component in the vehicle. Alternatively, the device for calibrating a camera system can be integrated in other components of the vehicle and particularly of the driver assistance system. Further, the receiving unit, the extraction unit, the association unit and the calibrating unit may be constructed as separate components. However, it is also possible and in many cases advantageous when the functionalities of the receiving unit, the extraction unit, the association unit and the calibrating unit are realized in their entirety or partially by means of an individual computational unit.

Further, the device according to the invention for calibrating a camera system can comprise a testing unit which is configured to check the calibration of the camera system. In case of unsuccessful calibration, the testing unit can initiate a new calibration.

According to a further embodiment form, the device for calibrating a camera system comprises the database with the features of the factory environment and the accompanying position information.

According to a further embodiment form, the first association unit is configured to associate features extracted from a plurality of images of the first image data and to add to the database the features which are extracted from a plurality of images of the first image data and which are associated.

The similarity of features extracted from different images of the first image data is compared in order to ascertain whether or not a feature was extracted from a plurality of images of the first image data. The first association unit can also comprise a tracking algorithm which tracks the movement of a feature between temporally successive images of a camera. Further, the first association unit can be configured to add a feature to the database if the feature was extracted from a plurality of images of the first image data and is not yet contained in the database. In this regard, the first association unit adds a new feature into the database but without storing position information for this feature in the database.

The position information of the feature newly added to the database by the first association unit can be determined by the calibrating unit. The calibrating unit can accordingly be configured to estimate position information of features of the factory environment in addition to extrinsic and intrinsic parameters of the camera system.

According to a further embodiment form, the first association unit is configured to detect movable objects of the factory environment and to remove and reject features of the movable objects of the factory environment from the database.

Generally, features of movable objects are not suitable for calibrating the camera system. Therefore, the first association unit can be configured to detect movable objects of the factory environment and to remove features of movable objects of the factory environment from the database. In so doing, the position information of the features of the movable objects of the factory environment is also removed from the database. Further, the features of the movable objects of the factory environment are rejected, i.e., are not further utilized for the calibration of the camera system.

According to a further embodiment form, the calibrating unit is configured to update the features and position information of the database.

The calibrating unit can be configured to also estimate position information of features of the factory environment in addition to the parameters of the camera system. The parameters of the camera system and the position information of features of the factory environment can be estimated jointly. Alternatively, the parameters of the camera system and the position information of features of the factory environment can be estimated sequentially.

Further, the calibrating unit can be configured to remove a feature of the factory environment and the accompanying position information from the database if the position information of the feature estimated by the calibrating unit deviates from the position information of the feature stored in the database by more than a previously determined threshold value.

Beyond this, the calibrating unit can be configured to update position information of features recorded in the database. This can take place, for example, if the position information of the feature estimated by the calibrating unit deviates from the position information of the features stored in the database by less than a previously determined threshold value.

The situation may also occur where the database has no position information assigned to a feature of the factory environment. This situation occurs when a feature was added to the database by the first association unit. The calibrating unit can therefore be configured to estimate the position information of the features of the factory environment which have not yet been localized in addition to the parameters of the camera system and to store the estimated position information in the database.

To summarize, the calibrating unit can be configured to update the database in order to improve the accuracy of the position information recorded therein for the features of the factory environment. Beyond this, the device for calibrating a camera system can include a transmitting/receiving unit for transmitting and receiving the database. The transmitting/receiving unit makes it possible for the database updated by the calibrating unit to be transmitted to further inventive devices for calibrating camera systems so that they can utilize the updated database. Therefore, a successive improvement of the database utilized for calibration can be achieved by means of the transmitting/receiving unit.

According to a further embodiment form, the calibrating unit is configured to utilize information about the first recording positions, the first recording directions or the position information of the database in order to resolve ambiguities in the estimation of parameters of the camera system.

In particular, the calibrating unit can be configured to utilize information about the first recording positions and the first recording directions or position information of the database in order to estimate the orientation of the camera system relative to the coordinate system of the vehicle or the installed height of the camera in the vehicle.

The calibrating unit can be configured to determine the orientation of the camera system relative to the coordinate system of the vehicle from an unaccelerated straight-line travel when the database has at least three non-collinearly arranged features which define a plane parallel to the ground plane and the at least three non-collinearly arranged features were associated by the first association unit in a plurality of images of the first image data. This is also possible when the position information of the features of the factory environment recorded in the database are unambiguous only up to similarity transformations. Accordingly, the database preferably comprises, inter alia, position information of features on the ground plane. The calibrating unit can be configured to determine, by means of structure-from-motion (SFM) methods according to Hartley and Zisserman, the motion vector of the camera system ambiguously up to the length from features of successive images of the first image data, which features are associated by the first association unit. Further, the calibrating unit can be configured to determine the pitch angle and the yaw angle of the camera system relative to the coordinate system of the vehicle via the rotation transformation which maps the normalized optical axis of the camera system by the shortest possible paths to the normalized translation vector of the vehicle movement (see also H. H. Chen, "A screw motion approach to uniqueness analysis of head-eye geometry", Proceedings CVPR 1991, Maui, Hi., USA, June 1991). If at least three non-collinearly arranged features of the factory environment that define a plane parallel to the ground plane were associated by the first association unit, the calibrating unit can also be configured to calculate the roll angle of the camera system relative to the coordinate system of the vehicle as the angle between the ground plane and the plane defined by the optical axis and the horizontal axis of the coordinate system of the camera.

Further, the calibrating unit can be configured to determine the installed height of the camera system in the vehicle when a distance is known absolutely (i.e., unambiguously) and at least three non-collinearly arranged features of the factory environment which define a plane parallel to the ground plane were associated by the first association unit, where the shortest distance between the two parallel planes is known. The distance can be, for example, the distance between two features of the factory environment in the database. In this case, scaling ambiguities of the position information of the database can be resolved. However, it is also possible that the distance is a distance between two of the first recording positions which is provided by an odometer. The homography of the plane motion can be estimated in the coordinate system of the camera system according to Hartley and Zisserman from the features of the factory environment which are extracted from two or more images of the first image data and associated by the first association unit and which define a plane parallel to the ground plane. According to R. Hartley and A. Zisserman, "Multiple View Geometry in Computer Vision", 2nd edition, Cambridge Univ. Press, 2004, the homography H can be calculated as $$H = K[R - t\, n^T d/h]$$

where K is the determined intrinsic calibration matrix, R is the determined rotation matrix, t is the normalized translation column vector, n is the normal vector, assumed to be known, of the ground plane relative to the coordinate system of the vehicle, d is the path length traveled by the vehicle, and h is the installed height of the camera. If a distance between two features of the database is known, the path length d can be estimated by means of bundle adjustment. Alternatively, the path length d can be provided by an odometer.

A second aspect of the invention relates to a system for calibrating a camera system for a driver assistance system for a vehicle. The system has a device according to the invention for calibrating a camera system and a measuring device for determining or updating the database. The measuring system comprises a calibrated reference camera system and a second receiving unit for receiving second image data of the factory environment, the second image data includes a plurality of images of the factory environment, the images of the second image data correspond to a plurality of second recording positions or a plurality of second recording directions, and the second image data were captured by the calibrated reference camera system. The measuring device further comprises a second extraction unit for extracting features from the second image data, a second association unit for associating features extracted from a plurality of images of the second image data, a reconstruction unit for determining position information of the features associated by the second association unit, and an input/output unit for storing in the database the features associated by the second association unit and the position information determined by the reconstruction unit.

The measuring device is configured to measure the factory environment, i.e., to determine an initial database comprising features of the factory environment and accompanying position information. In addition, the measuring device can also be configured to update the database. This can be relevant when there are larger deviations between the actual positions and the positions of the features of the factory environment which are stored in the database.

The measuring device comprises a calibrated reference camera system and a second receiving unit for receiving second image data of the factory environment, the second image data comprise a plurality of images of the factory environment captured by the calibrated reference camera system from a plurality of second recording positions or a plurality of second recording directions. Knowledge of the second recording positions or second recording directions is not required for the measuring device.

The second extraction unit of the measuring device differs from the first extraction unit of the device for calibrating the camera system substantially in that it works on the second image data. The second extraction unit accordingly searches in the second image data for features suitable for the calibration and extracts them.

The second association unit of the measuring device is configured to search features of the factory environment which were extracted from a plurality of images of the second image data. The second association unit can utilize a tracking algorithm which tracks the displacement of features between temporally successive images of a camera.

The measuring device further comprises a reconstruction unit for determining position information of the features associated by the second association unit. To this end, the reconstruction unit can utilize in particular the Hartley-Zisserman bundle adjustment method known from the art. The reconstruction unit of the measuring device can be configured to utilize previously determined position information of features of the factory environment or distances between features in order to avoid ambiguities during the determination of the position information of the features extracted from the second image data.

The input/output unit for storing in a database the features associated by the second association unit and the position information determined by the reconstruction unit is preferably also configured to transmit the database to a device according to the invention for calibrating a camera system. Further, the input/output unit of the measuring device can be configured to check the suitability of the database for calibrating the camera system.

The second receiving unit, the second extraction unit, the second association unit, the reconstruction unit and the input/output unit can be constructed as separate components. Alternatively, these units of the measuring device or a portion of these units can be implemented by means of an individual computational unit.

According to a further embodiment form, the second association unit of the measuring device is configured to detect movable objects of the factory environment and to reject features of the movable objects of the factory environment.

Similar to the first association unit of the device for calibrating a camera system, the second association unit of the measuring device can also be configured to detect movable objects of the factory environment and reject features of the movable objects of the factory environment. In particular, the second association does not send any features of movable objects to the reconstruction unit of the measuring device because taking these features into account when determining position information can result in impaired accuracy. Moreover, it is ensured that the features of movable objects are not entered in the database in order to prevent the first association unit of the device for calibrating a camera system from associating any features of movable objects.

According to a further embodiment form, the reconstruction unit of the measuring device is configured to utilize information about the second recording positions, the second recording directions or prior-known position information of features of the factory environment in order to resolve ambiguities when determining the position information of the features associated by the second association unit.

In particular, features of the factory environment can be measured and/or special targets can be arranged in the factory environment. The input/output unit of the measuring device can be configured to enable input of previously determined position information of features so that the reconstruction unit can utilize this previously determined position information to resolve ambiguities when determining the position information of the features associated by the second association unit.

A third aspect of the invention relates to a method for calibrating a camera system of a vehicle. The method includes receiving first image data which include a plurality of images of a factory environment, the images of the first image data correspond to a plurality of first recording positions or a plurality of first recording directions, and the first image data were recorded by the camera system to be calibrated. Further, features are extracted from the first image data and the extracted features are associated with features of a database, the database comprises features of the factory environment and accompanying position information. The camera system is then calibrated using the first image data and the position information of the associated features.

The method according to the invention can be configured to calibrate mono-camera systems as well as to calibrate multi-camera systems. The first recording positions and the first recording directions may be unknown. The number of different first recording positions and/or recording directions required for calibrating the camera system depends in particular on the complexity of the camera model to be estimated. In a multi-camera system, the cameras preferably capture the images simultaneously. However, the method according to the invention for calibrating a camera system can also be configured to support asynchronous image recordings. When extracting features from the images of the first image data, point features are searched in particular.

The method according to the invention utilizes a database with features of the factory environment and accompanying position information. The position information preferably comprises the unambiguous positions of the features relative to a fixed coordinate system. In certain cases, however, it may be sufficient if the positions of the features are known only up to similarity transformations. This is the case particularly when only intrinsic parameters of the camera system are to be estimated.

The features extracted from the first image data are associated with features of the factory environment recorded in the database in order to determine position information of the features extracted from the images of the first image data. In so doing, the similarity of features extracted from the images of the first image data to features of the database is determined. If a feature extracted from the first image data is sufficiently similar to a feature stored in the database, the position information recorded in the database is associated with the extracted feature.

The first image data and the position information of the features of the factory environment associated by the first association unit are utilized to calibrate the camera system. Both extrinsic and intrinsic parameters of the camera system can be estimated. Alternatively, only a subset of these parameters can be estimated.

Further, the method according to the invention for calibrating a camera system can include testing the estimated parameters of the camera system. If calibration is unsuccessful, a new calibration can be initiated, for example.

According to a further embodiment form, the method for calibrating a camera system includes associating features extracted from a plurality of images of the first image data and adding to the database features which are extracted from a plurality of images of the first image data and which are associated.

In this regard, the similarity of features extracted from different images of the first image data is compared in order to ascertain whether or not a feature was extracted from a plurality of images of the first image data. If a feature was extracted from a plurality of images of the first image data, it can be added to the database and no accompanying position information is stored because it is not known initially. During the calibration of the camera system, in addition to extrinsic and intrinsic parameters of the camera system, position information of features of the factory environment can also be estimated. Accordingly, it is possible to estimate the initially unknown position information of newly added features in the calibrating step and to store them in the database.

According to a further embodiment form, the method for calibrating a camera system includes detecting movable objects of the factory environment from the first image data, removing features of movable objects of the factory environment from the database, and rejecting features of movable objects of the factory environment.

Features of movable objects are generally not suitable for calibrating the camera system. Therefore, the method according to the invention for calibrating a camera system is configured to detect movable objects of the factory environment and to remove features of movable objects of the factory environment from the database along with the accompanying position information.

According to a further embodiment form, the method for calibrating a camera system includes updating the features and position information of the database.

The calibrating step in the method according to the invention for calibrating a camera system can be configured to also estimate position information of features of the factory environment in addition to the parameters of the camera system. The position information of features of the factory environment which is estimated can be used to update the database. For example, a feature of the factory environment and the accompanying position information can be removed from the database if the estimated position information of the feature deviates from the position information of the feature stored in the database by more than a previously determined threshold value. Further, position information of features recorded in the database can be updated if the last estimated position information of the feature deviates from the position information of the feature stored in the database by less than a previously determined threshold value.

The updating of the database is preferably configured to successively improve the accuracy of the position information. The method according to the invention for calibrating a camera system can also include transmitting and receiving the database. This makes it possible to reproduce the updated database so that it is available for further camera systems which are to be calibrated.

According to a further embodiment form, the method for calibrating a camera system includes receiving information about the first recording positions or the first recording directions and using the information about the first recording positions or the first recording directions or position information of the features of the database to resolve ambiguities during the calibration of the camera system.

Information about the first recording positions or the first recording directions can be obtained, for example, by means of odometry sensors and acceleration sensors. The information about the first recording positions, the first recording directions or the position information of features of the database can be used in particular to estimate the orientation of the camera system relative to the coordinate system of the vehicle and the installed height of the camera system in the vehicle.

According to a further embodiment form, the method for calibrating a camera system includes a method for determining or updating the database having the following steps: receiving second image data of the factory environment, which second image data comprise a plurality of images of the factory environment, which images of the second image data correspond to a plurality of second recording positions or a plurality of second recording directions, and the second image data were recorded by a calibrated reference camera system; extracting features from the second image data; associating features extracted from a plurality of images of the second image data; calculating position information of the features which are extracted from a plurality of images of the second image data and which are associated; storing the associated features and the calculated position information of the features in the database.

A calibrated reference camera system is used to determine or update the database. Images of a plurality of second recording positions and/or a plurality of second recording directions are captured with this reference camera system. Knowledge of the second recording positions and second recording directions is not required for the method according to the invention for determining or updating the database. Point features are preferably extracted from the images of the second image data. In a subsequent step, the extracted features can be associated. The similarity of extracted features is checked to determine features of the factory environment which were extracted from a plurality of images of the second image data. A tracking algorithm which tracks the displacement of features between temporally successive images of a camera can be used. The calculation of the position information of the associated features can be carried out, for example, by the method of bundle adjustment according to Hartley and Zisserman. In so doing, information about the second recording positions, the second recording directions, previously determined position information of features of the factory environment or distances between features can be used to avoid ambiguities when determining position information of features extracted from the second image data. The associated features are stored in the database together with position information.

According to a further embodiment form, the method for determining or updating the database further includes detecting movable objects of the factory environment and rejecting the features of the detected movable objects of the factory environment.

In this way, features of movable objects are prevented from negatively influencing the accuracy of estimating the position information of the associated features of the factory environment.

Embodiment examples of the invention will be described in the following with reference to the figures.

BRIEF DESCRIPTION OF THE FIGURES

Similar or identical elements in the figures are denoted by similar or identical reference numerals. The figures are schematic representations.

DETAILED DESCRIPTION OF EMBODIMENT EXAMPLES

Figure 1:
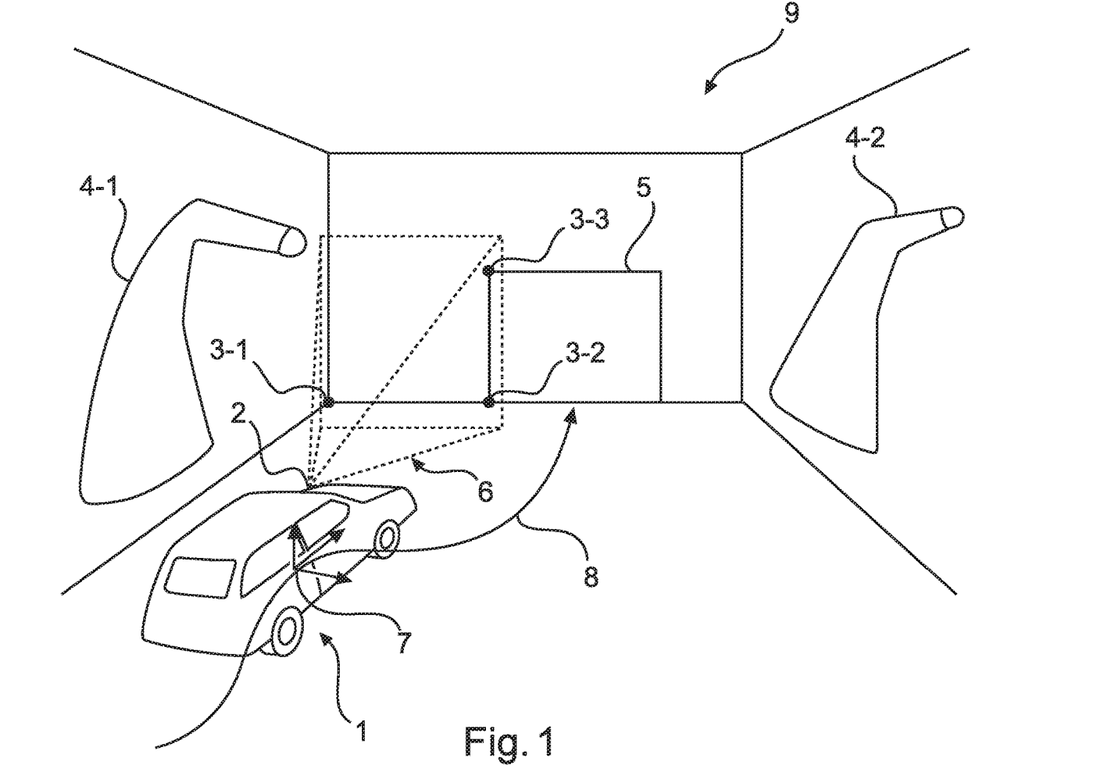
FIG. 1 shows the dynamic calibration of a camera system for a driver assistance system in a factory environment.

FIG. 1 illustrates the dynamic calibration of a camera system 2 for a driver assistance system of a vehicle 1. The camera system 2 is fixedly installed in the vehicle 1. The camera system may be a mono-camera system or a multi-camera system. In the interest of simplicity, only a mono-camera system 2 is shown in FIG. 1. The vehicle 1 moves along a trajectory 8 through the factory environment 9. The trajectory 8 may be unknown for the calibration of the camera system 2. The camera system captures images of the factory environment while the vehicle 1 moves through the factory environment. Accordingly, images of the factory environment are captured from a plurality of positions and directions.

Features which are suitable for calibration are extracted from the recorded images. Point features are preferably extracted from the recorded images. In the scene represented by way of example in FIG. 1, the viewing cone 6 of the camera system 2 includes features 3-1, 3-2 and 3-3 so that these features can be extracted from a recorded image. The factory environment need not have any targets specially arranged for calibrating the vehicle. Both stationary objects 5 and movable objects 4-1 and 4-2 may be located in the factory environment 9.

A database which stores features of the factory environment and accompanying position information is used for calibrating the camera system. Both intrinsic and extrinsic parameters of the camera system 2 can be estimated in the calibration. However, it is also possible for only a portion of these parameters to be estimated. The intrinsic parameters of a camera of the camera system 2 are in particular the focal length, the geometry of the image sensor and the position of the focal point. In contrast, the extrinsic parameters of a camera of the camera system 2 describe the position and orientation of the camera relative to a coordinate system 7 of the vehicle 1.

The device according to the invention for calibrating a camera system is configured to enable a dynamic calibration of the camera system without targets. In particular, the device according to the invention makes it possible to calibrate a camera system of a vehicle without the vehicle needing to be moved into a predetermined position or orientation relative to a target.

Figure 2:
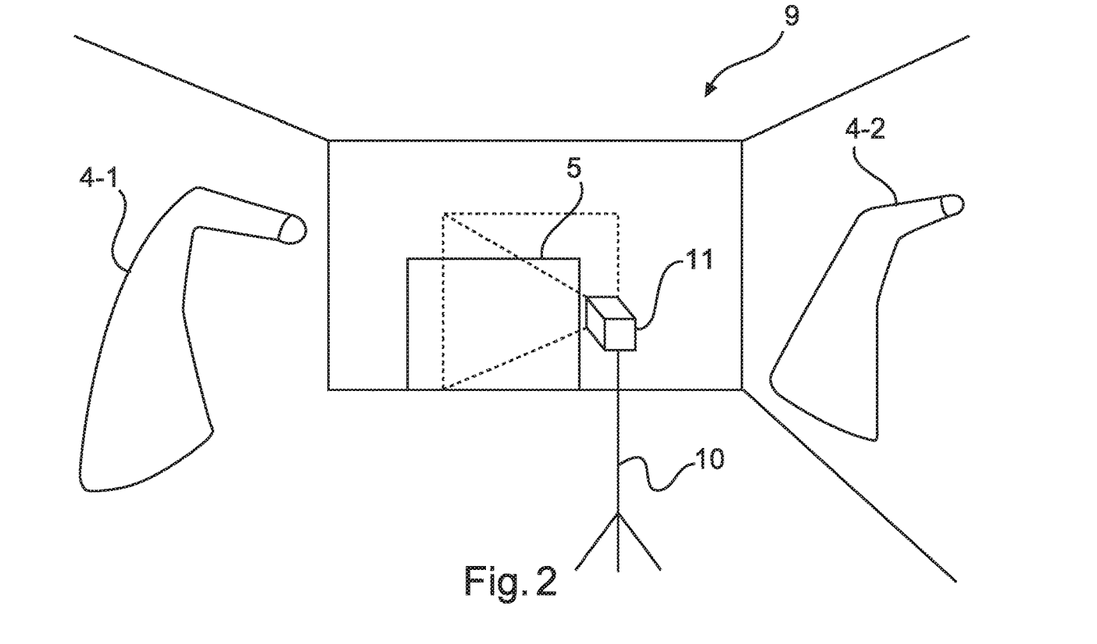
FIG. 2 shows the measurement of the factory environment by means of a calibrated reference camera system.

FIG. 2 schematically shows the measurement of the factory environment 9 by means of a reference camera system 11. In FIG. 2, the reference camera system 11 is mounted on a tripod 10. Alternatively, it is possible, for example, for the reference camera system 11 to be hand-held. Images of the factory environment are captured from a plurality of recording positions and recording directions by the reference camera system 11. The factory environment 9 in turn comprises both stationary objects 5 and movable objects 4-1 and 4-2. During the measurement of the factory environment, position information of features of the factory environment are calculated from the images captured by the calibrated reference camera system 11. The calculated position information is stored in a database together with the accompanying features. The database can then be used by a device according to the invention for calibrating a camera system. Therefore, the measurement of the factory environment serves for the initial determination of the database required for the device according to the invention for calibrating a camera system.

Figure 3:
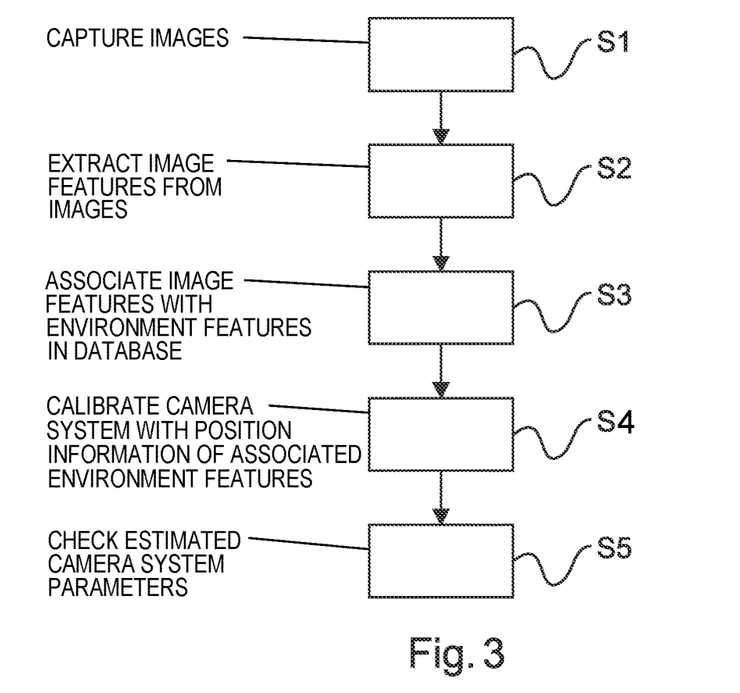
FIG. 3 illustrates the method for calibrating a camera system for a driver assistance system.

FIG. 3 schematically shows the method according to the invention for calibrating a camera system for a driver assistance system. In step S1, a plurality of images of a factory environment is captured from various recording positions and recording directions by the camera system to be calibrated.

In step S2, features are extracted from the images captured with the camera system to be calibrated. Since the factory environment includes both movable objects and stationary objects, features of movable objects and stationary objects are extracted from the recorded images.

In step S3, the extracted features are associated with features of the factory environment which are stored in a database. In other words, the similarity of the extracted features to features recorded in the database is checked.

Aside from features of the factory environment, the database also includes position information of the features. In particular, the database can include positions of features of the factory environment relative to a fixed coordinate system. However, it is also possible that the database comprises determined position information of the features of the factory environment only up to similarity transformations. In particular, intrinsic parameters of the camera system can also be calibrated when the positions of the features recorded in the database are known only up to similarity transformations. The association of extracted features of the factory environment with features stored in the database is carried out with the aim of determining position information of the extracted features. The database preferably does not comprise any features of movable objects, since, as a rule, they are not suitable for the calibration of the camera system.

The extracted features for which position information were able to be determined through association can be used subsequently for calibration S4. Beyond this, the image data captured by the camera system to be calibrated are utilized for calibration. Both intrinsic and extrinsic parameters of the camera system 2 can be estimated in the calibration.

In step S5, the estimated parameters of the camera system can be checked. If the calibration was unsuccessful, a repetition of the calibrating process may be required.

Figure 4:
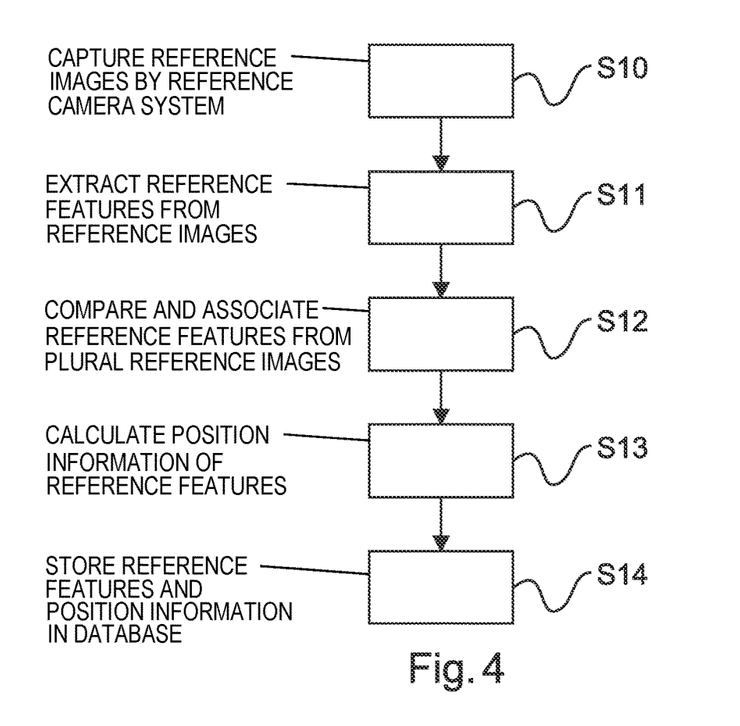
FIG. 4 illustrates the method for measuring the factory environment.

FIG. 4 illustrates the method according to the invention for determining or updating the database which is used by the method according to the invention for calibrating a camera system. In so doing, images of the factory environment are captured from a plurality of recording positions and/or a plurality of recording directions by a reference camera system in step S10. The recording positions and recording directions need not be known.

In step S11, features of the factory environment are extracted from the recorded images.

In step S12, features extracted from different images are compared with one another in order to ascertain which features were extracted from a plurality of images. Accordingly, in step S12 an association of features extracted from different images is carried out. The features belonging to movable objects can also be detected in step S12. Features of movable objects can be rejected for the following steps of determining or updating the database because these features can lead to an impairment in the accuracy of position determination of the features of the factory environment.

In step S13, position information of the features is calculated from the images captured with the calibrated reference camera system and the associations made in step S12 of features extracted from the images.

In step S14, the determined position information and the accompanying features of the factory environment are stored in a database. Further, it can be checked whether or not the database is suitable for the calibration of a camera system, particularly whether or not the database has enough features and features which are spread over wide areas of the factory environment.

It should be additionally noted that "comprising" and "having" do not preclude other elements or steps and that the indefinite article "a" or "an" does not preclude a plurality. It should be further noted that features or steps which have been described with reference to one of the above embodiment examples can also be used in combination with other features or steps of other embodiment examples described above. Reference numerals in the claims are not to be construed as limiting.

The invention claimed is:

1. An apparatus for initially calibrating an as-yet-uncalibrated camera system of a vehicle, comprising a calibration device that comprises:
   a first receiving unit configured to receive first image data comprising images of a factory environment recorded by the camera system from a plurality of first recording positions or a plurality of first recording directions, wherein the factory environment is a site at which the vehicle is being manufactured or serviced, and the camera system has not yet been calibrated and is to be initially calibrated,
   a first extraction unit configured to extract image features from the first image data,
   a first association unit configured to associate the image features extracted from the first image data with environment features of the factory environment provided from a database that stores the environment features of the factory environment and accompanying position information of the environment features, and
   a calibrating unit configured to estimate extrinsic and intrinsic parameters of the camera system based on the first image data and the position information accompanying the environment features to which the image features have been associated, and to perform an initial calibration of the camera system based on the extrinsic and intrinsic parameters, and to update the database based on the image features extracted from the first image data, wherein the updating of the database comprises at least one of: adding an additional one of the environment features to the database, removing a rejected one of the environment features from the database, adding an additional item of the position information to the database, removing a rejected item of the position information from the database, and/or updating a value of an item of the position information in the database.

2. The apparatus according to claim 1, further comprising the database with the environment features of the factory environment and the accompanying position information.

3. The apparatus according to claim 1, wherein the first association unit is further configured to associate, with one another, corresponding ones of the image features extracted respectively from plural images of the first image data to generate a verified image feature, and wherein the calibrating unit is configured to add to the database the verified image feature as the additional environment feature.

4. The apparatus according to claim 1,
   wherein the first association unit is configured to detect, in the first image data, a dynamic object that has moved or is moving, and
   wherein the calibrating unit is configured to remove from the database an image feature of the dynamic object as the rejected environment feature.

5. The apparatus according to claim 1, wherein the calibrating unit is configured to utilize information about the first recording positions or the first recording directions, or the position information of the database, to resolve ambiguities in the estimating of the extrinsic and intrinsic parameters of the camera system.

6. The apparatus according to claim 1,
   further comprising a measuring device configured to determine or update the database, wherein the measuring device comprises:
   a calibrated reference camera system,
   a second receiving unit configured to receive second image data comprising images of the factory environment recorded by the calibrated reference camera system from a plurality of second recording positions or a plurality of second recording directions,
   a second extraction unit configured to extract second image features from the second image data,
   a second association unit configured to associate, with one another, corresponding ones of the second image features extracted respectively from plural images of the second image data to generate verified second image features,
   a reconstruction unit configured to determine position information of the verified second image features, and
   an input/output unit configured to store in the database the verified second image features as the environment features, and the position information determined by the reconstruction unit.

7. The apparatus according to claim 6, wherein the second association unit is configured to detect, in the second image data, a dynamic object that has moved or is moving, and to exclude features of the dynamic object from the database.

8. The apparatus according to claim 6, wherein the reconstruction unit is configured to utilize information about the second recording positions or the second recording directions, or prior-known position information of features of the factory environment, to resolve ambiguities when determining the position information of the verified second image features.

9. A method of initially calibrating an as-yet-uncalibrated camera system of a vehicle, the method comprising steps:
   receiving first image data comprising images of a factory environment recorded by the camera system from a plurality of first recording positions or a plurality of first recording directions, wherein the factory environment is a site at which the vehicle is being manufactured or serviced, and the camera system has not yet been calibrated and is to be initially calibrated,
   extracting image features from the first image data,
   associating the image features extracted from the first image data with environment features of the factory environment provided from a database that stores the environment features of the factory environment and accompanying position information of the environment features,
   estimating extrinsic and intrinsic parameters of the camera system based on the first image data and the position information accompanying the environment features to which the image features have been associated,
   performing an initial calibration of the camera system based on the extrinsic and intrinsic parameters, and
   updating the database based on the image features extracted from the first image data, wherein the updating of the database comprises at least one of: adding an additional one of the environment features to the database, removing a rejected one of the environment features from the database, adding an additional item of the position information to the database, removing a rejected item of the position information from the database, and/or updating a value of an item of the position information in the database.

10. The method according to claim 9, further comprising steps:
    associating, with one another, corresponding ones of the image features respectively extracted from plural images of the first image data to generate a verified image feature, and adding to the database the verified image feature as the additional environment feature.

11. The method according to claim 9, further comprising steps:
   detecting, in the first image data, a dynamic object that has moved or is moving, and
   removing from the database an image feature of the dynamic object as the rejected environment feature.

12. The method according to claim 9, further comprising steps:
   receiving information about the first recording positions or the first recording directions, and
   using the information about the first recording positions or the first recording directions, or the position information of the database to resolve ambiguities during the estimating of the extrinsic and intrinsic parameters of the camera system.

13. The method according to claim 9, further comprising a second updating or an initial determining of the database, which comprises steps:
   receiving second image data comprising images of the factory environment recorded by a calibrated reference camera system from a plurality of second recording positions or a plurality of second recording directions,
   extracting second image features from the second image data,
   associating, with one another, corresponding ones of the second image features extracted respectively from plural images of the second image data to generate verified second image features,
   calculating position information of the verified second image features, and
   storing, in the database, the verified second image features as the environment features, and the calculated position information.

14. The method according to claim 9, wherein the updating of the database comprises the adding of the additional environment feature to the database.

15. The method according to claim 9, wherein the updating of the database comprises the removing of the rejected environment feature from the database.

16. The method according to claim 9, wherein the updating of the database comprises the adding of the additional item of the position information to the database.

17. The method according to claim 9, wherein the updating of the database comprises the removing of the rejected item of the position information from the database.

18. The method according to claim 9, wherein the updating of the database comprises the updating of the value of the item of the position information in the database.

19. The method according to claim 9, applied repeatedly in successive iterations to initially calibrate the respective camera systems of a plurality of vehicles in succession, using a same single said database, wherein the updating of the database performed respectively in the successive iterations successively improves accuracy of the database.

* * * * *

UNITED STATES PATENT AND TRADEMARK OFFICE
CERTIFICATE OF CORRECTION

PATENT NO. : 11,062,478 B2
APPLICATION NO. : 16/609609
DATED : July 13, 2021
INVENTOR(S) : Aless Lasaruk et al.

It is certified that error appears in the above-identified patent and that said Letters Patent is hereby corrected as shown below:

On the Title Page

Page 2, Right Column,
Item (56), References Cited, OTHER PUBLICATIONS
Line 1, before "10 pages", replace "2016" with --2018--;

In the Specification

Column 5,
Line 33, after "Maui", replace "Hi.," with --HI,--;
Line 64, replace the equation to read:
--$H = K [R - t n^T d / h] K^{-1}$,--.

Signed and Sealed this
Seventh Day of June, 2022

Katherine Kelly Vidal
*Director of the United States Patent and Trademark Office*